United States Patent [19]

Schwartz et al.

[11] Patent Number: 4,847,768

[45] Date of Patent: Jul. 11, 1989

[54] AUTOMATIC ENGINE OIL CHANGE INDICATOR SYSTEM

[75] Inventors: Ellen S. Schwartz, Warren; Donald J. Smolenski, St. Clair Shores; John D. Keersmaekers, Mason; Christine M. Traylor, Flint; Gary J. Wallo, Union Lake, all of Mich.

[73] Assignee: General Motors Corporation, Detroit, Mich.

[21] Appl. No.: 237,762

[22] Filed: Aug. 29, 1988

[51] Int. Cl.$^4$ .................... G06F 15/20; F01M 11/10
[52] U.S. Cl. ................ 364/424.03; 340/449; 340/457.4; 73/117.3; 73/64
[58] Field of Search ............. 364/424.03, 424.04, 364/550, 551.01; 340/52 R, 52 D, 52 F; 73/117.3, 64; 123/196 R, 196 S

[56] References Cited

U.S. PATENT DOCUMENTS

| | | | |
|---|---|---|---|
| 4,007,629 | 2/1977 | Hochstein | 73/64 |
| 4,328,480 | 5/1982 | Keitel et al. | 340/52 F |
| 4,506,337 | 3/1985 | Yasuhara | 73/117.3 |
| 4,533,900 | 8/1985 | Muhlberger et al. | 73/117.3 |
| 4,551,703 | 11/1985 | Rourauel et al. | 340/52 D |
| 4,629,334 | 12/1986 | Hochstein | 73/64 |
| 4,677,847 | 7/1987 | Sawatari et al. | 73/117.3 |
| 4,706,193 | 11/1987 | Imajo et al. | 364/424.03 |
| 4,742,476 | 5/1988 | Schwartz et al. | 364/424.03 |
| 4,796,204 | 1/1989 | Inoue | 73/117.3 |

FOREIGN PATENT DOCUMENTS

| | | |
|---|---|---|
| 0057820 | of 1982 | European Pat. Off. |
| 0062868 | of 1982 | European Pat. Off. |
| 0174601 | 3/1986 | European Pat. Off. |
| 0019458 | 8/1986 | European Pat. Off. |
| 0030428 | 2/1985 | Japan |

OTHER PUBLICATIONS

"Development of an Automatic Engine Oil-change Indicator System", SAE 870403, 2/87.

*Primary Examiner*—Gary Chin
*Attorney, Agent, or Firm*—Robert M. Sigler

[57] ABSTRACT

An apparatus and method is disclosed for indicating useful life of motor vehicle engine oil during engine operation based on engine oil temperature without direct measurement thereof. Following the initiation of engine operation, engine oil temperature is calculated from a warmup equation until calculated engine oil temperature exceeds a warmup reference, whereupon it is calculated from an equilibrium equation, both of which equations being linear combinations of engine operating parameters other than engine oil temperature itself. The warmup equation includes a constant term, a reference temperature term fixed at the begining of engine operation and a term increasing proportionally with the number of engine cylinder firings. The equilibrium equation includes a constant term, an engine temperature term and a term proportional to engine speed and may also include a term proportional to an engine cooling factor.

14 Claims, 5 Drawing Sheets

AUTOMATIC ENGINE OIL CHANGE INDICATOR SYSTEM

BACKGROUND OF THE INVENTION

This invention relates to the calculation of the temperature of engine lubricating oil without direct measurement thereof based on measurement of other engine parameters in engine operation. It particularly relates to the use of such a calculated engine oil temperature in an electronic indicator apparatus for providing the operator of an engine driven motor vehicle with information pertaining to when the engine oil should be changed.

It is well known in the motor vehicle art that engine durability is directly related to the lubricating ability of the engine crankcase oil, and that its lubricating ability becomes degraded with engine operation and time. Thus, most engine and vehicle manufacturers provide their customers with guidelines for determining when the engine oil should be changed.

By way of example, the General Motors Corporation Maintenance Schedule for gasoline fueled passenger cars and light trucks recommends that, barring severe operating conditions, the engine oil should be changed every 7,500 miles (12,000 km) or 12 months, whichever comes first. Under severe operating conditions, however, the schedule recommends that the engine oil be changed every 3,000 miles (4,800 km) or 3 months, whichever comes first. In this regard, severe operating conditions are defined as including trips less than 4 miles (6.4 km) in below freezing weather, extended idling, trailer towing, operating in dusty areas, and extended stop-and-go driving.

Those skilled in the art recognize that oil change maintenance schedules of the type set forth above are only guidelines, and that depending on the engine operating conditions, the required oil change interval may be as short as 1,700 miles (2,720 km) or as long as 10,000 miles (16,000 km). Accordingly, it has been proposed to provide an estimate of the required oil change interval for a given vehicle by electronically monitoring certain key engine operating parameters in the course of vehicle operation between oil changes. When it is determined that an oil change is required, the operator is so informed by an instrument panel indicator. In one system, for example, the actual mileage of the vehicle is multiplied by a factor, the value of which is varied according to the operating speed of the engine, and an engine load indication (such as coolant temperature) to arrive at a calculated mileage. When the calculated mileage exceeds a threshold, an indicator is tripped to inform the operator that an oil change is required.

Research in this area has shown that a more direct and accurate indication of the oil degradation, and therefore the need for an oil change, can be determined by monitoring the temperature of the oil, without regard to engine loading or operating conditions which are indirectly related to oil temperature variations. Excessive degradation of the engine oil occurs at its temperature extremes. At high oil temperatures, antioxidants in the oil tend to become depleted, and the oil becomes more viscous and acidic due to oxidation and nitration. In addition, insoluble particles are deposited on the engine surfaces as a varnish or sludge. At low oil temperatures, fuel, water and soot tend to accumulate in the oil, reducing its viscosity and increasing wear. In addition, acids produced by incomplete combustion reduce the ability of the oil to prevent rust and corrosion. This research led to the invention of an automatic engine oil change indicator system as claimed and described in U.S. Pat. No. 4,742,476, issued May 3, 1988 to Schwartz et al. The system of this patent used an engine oil temperature sensor in the crankcase to specifically measure engine oil temperature and provide a signal thereof as the primary sensed input to the control system. If there is no other function served by an engine oil temperature sensor, however, it would be desirable for reduced cost to provide such a system in which the engine oil temperature may be accurately estimated from the signals of other sensors already present.

SUMMARY OF THE INVENTION

This invention provides an apparatus and method for indicating the useful life of lubricating oil in an engine subject to varying operating conditions which is based on engine oil temperature for accuracy but which determines the oil temperature without direct measurement thereof from other engine parameters and thus does not require an oil temperature sensor.

The invention is for use in a motor vehicle having an engine containing lubricating engine oil which has a useful life that varies in accordance with engine operating conditions and apparatus for determining the remaining useful life of the engine oil in engine operation from the temperature thereof.

The apparatus of the invention comprises means for storing a datum having a first value indicating that the engine oil temperature is in a warming range and a second value indicating that the engine oil temperature is in an equilibrium range, the stored datum being set to the first value at the beginning of engine operation, means responsive to the first value of the stored datum to calculate the engine oil temperature $T_o$ according to a warmup equation $T_o = k_1 + k_2 T_r + k_3 F_f$, wherein $T_r$ is a reference temperature indicative of engine oil temperature at the beginning of engine operation, $F_f$ is a firing factor proportional to the number of combustion firings since the beginning of engine operation, and $k_1$, $k_2$ and $k_3$ are constants, means responsive to the second value of the stored datum to calculate the engine oil temperature $T_o$ according to an equilibrium equation $T_o = k_4 + k_5 T_e + k_6 S_e$, wherein $T_e$ is an engine temperature, $S_e$ is engine rotational speed, and $k_4$, $k_5$ and $k_6$ are constants, means for storing the calculated engine oil temperature $T_o$ for use by the apparatus for determining the remaining useful life of the engine oil, and means for setting the stored datum to its second value when the calculated engine oil temperature $T_o$ exceeds a predetermined warmup temperature. The reference temperature $T_r$ may be, for example, the initial engine coolant temperature $T_c$ at the beginning of engine operation; and the engine temperature $T_e$ may be engine coolant temperature during engine operation.

In a variation of the invention, an additional term $k_7 F_c$ is added to the equilibrium equation to account for cooling effects on the engine, wherein $k_7$ is an additional constant and $F_c$ is a cooling factor such as ambient air temperature, vehicle speed or a linear combination of both. In another variation of the invention, the reference temperature $T_r$ is decreased from the initial coolant temperature $T_c$ when engine operation is initiated after having been turned off from a previous operation for only a short time $D_t$, which time is less than a predetermined short time off duration.

The indicator system of this invention can be mechanized with a computerized engine or other system control unit such as that described in the aforementioned Schwartz et al patent to provide a reliable indication of required oil change based on empirical data and measured values of the engine operating factors as described but without the cost of the engine oil sensor. Both the computer and the sensors for these engine operating parameters are, in most cases, already present as an engine control system and thus do not represent additional cost.

DESCRIPTION OF A PREFERRED EMBODIMENT

Figure 1:
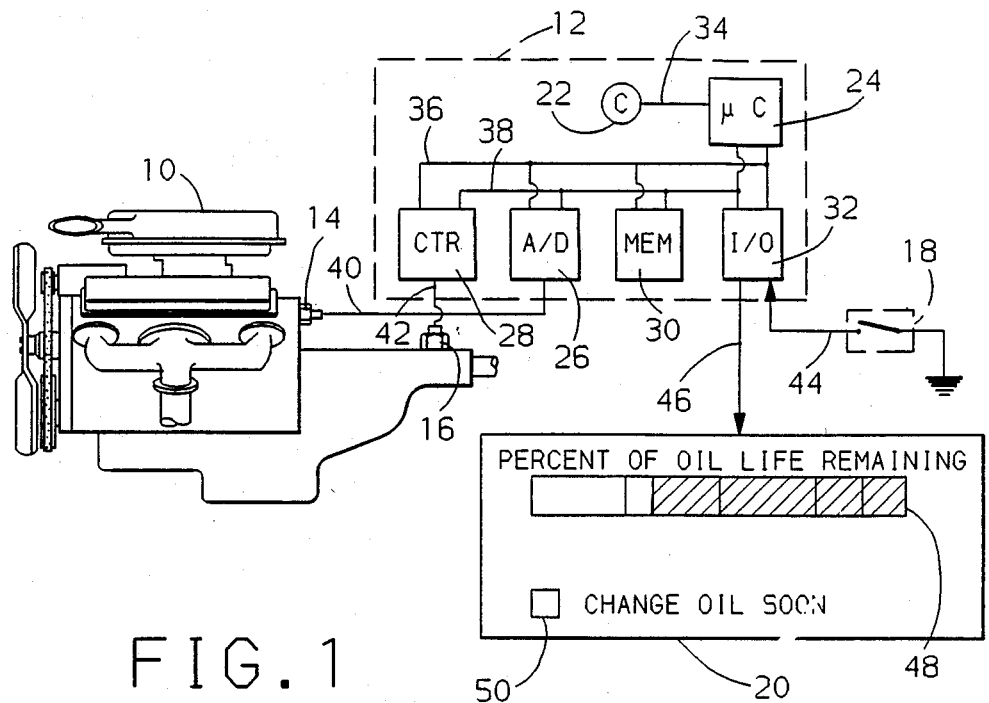
FIG. 1 is a schematic diagram of a computerized control unit and indicator for mechanizing the oil change indicator system of this invention.

Referring now to the drawings, FIG. 1 schematically depicts an oil change indicator system according to this invention with a conventional motor vehicle engine 10. The oil change indicator system comprises a computerized control unit 12, an engine coolant temperature sensor 14, an engine speed sensor 16, an oil change reset switch 18, and an instrument panel display unit 20. Essentially, inputs from the sensors 14 and 16, from the oil change reset switch 18, and from any other sensors not shown are applied to control unit 12, which in turn generates a suitable operator readout on the display unit 20.

The control unit 12 includes conventional computer control elements, including a Clock 22, a Microcomputer 24, an Analog-to-Digital Converter (A/D) 26, a Counter (CTR) 28, a nonvolatile Memory 30, and an Input/Output device (I/O) 32. The Clock 22 provides high frequency pulses to Microcomputer 24 via line 34, and the elements 24-32 communicate with each other via an Address and Control Bus 36 and a bi-directional Data Bus 38. The analog output of coolant temperature sensor 14 on line 40 is applied as an input to A/D 26 where it is converted to a digital format and made available for acquisition via Data Bus 38. The digital pulse train output of engine speed sensor 16 on line 42 is applied as an input to Counter 28 where it is divided down to a rate of one pulse per engine revolution and made available for acquisition via Data Bus 38. The digital output of oil change reset switch 18 on line 44 is applied as an input to I/O device 32, and the digital information for controlling the operation of display unit 20 is outputted from I/O device 32 via line 46.

The sensors 14 and 16 may be conventional temperature and speed transducers. Thus, temperature sensor 14 may be a varistor element housed in a conductive probe positioned in the mainstream of engine coolant flow or in any location where the measured engine coolant temperature is representative of the temperature of the engine as commonly understood by those skilled in the art of vehicle engine design; and the speed sensor 16 may be a variable reluctance magnetic pickup cooperating with a toothed ferromagnetic wheel coupled to the engine crankshaft. More detailed specifications of such sensors are readily available to those skilled in the art and therefore are not supplied herein. The oil change reset switch 18 may be a conventional momentary contact single-pole-single-throw switch as shown. Other sensors for engine operating or environmental parameters are not shown but may include such devices as a vehicle speed sensor, intake manifold temperature sensor or ambient air temperature sensor. Each communicates with computer 12, if included, through an appropriate one of the input devices already described.

The display unit 20 may include a bar-type continuous readout 48, a lamp 50, and drivers for the same. The readout 48 continuously indicates the percent of oil life remaining, and the lamp 50 indicates required action by the operator of the vehicle. In particular, the lamp 50 is lit when the remaining oil life falls below 10%, and indicates that the operator should "change oil soon". It will be recognized that other types of displays may also be appropriate, such as a numerical indication of the number of miles (kilometers) to the next oil change.

Figure 2:
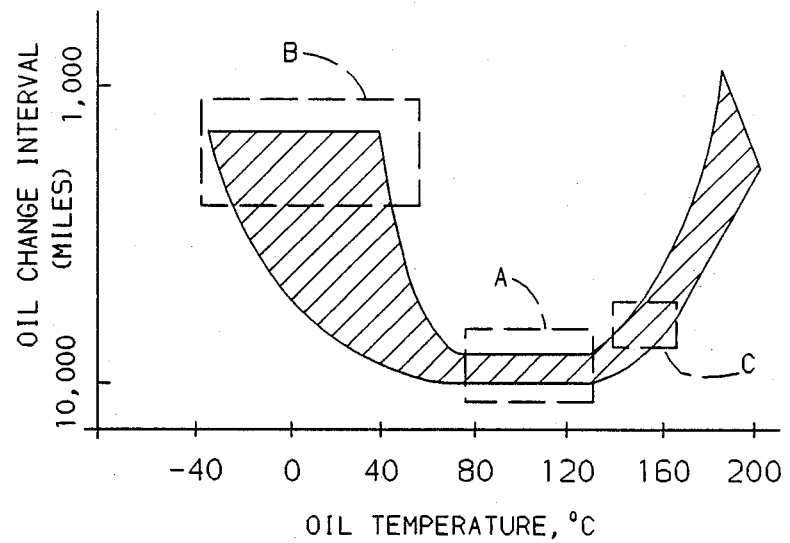
FIG. 2 is a graphical representation of data relating required oil change interval to oil temperature in motor vehicles.

FIG. 2 is a graphical representation of an extensive body of data relating recommended oil change interval to oil temperature, with oil change interval plotted reciprocally as a function of oil temperature. The criteria for determining the necessity of an oil change included limiting thresholds based on fuel dilution, acidity/basicity, soot accumulation, oxidation induction time, viscosity increase, and a Coordinating Research Council (CRC) rust rating. As soon as one limiting value was exceeded, it was considered that the oil should be changed. The body of data included within the box A represents ideal operating service for oil life, as would occur in long trips during moderate ambient temperatures. Under such conditions, very little damage occurs to an engine, and the oil change interval may be as high as 10,000 miles (16,000 km). The body of data included within the box B represents cold temperature, short trip service, where the average trip length is approximately 2.5 miles (4.0 km). Under such conditions, fuel dilution and engine wear become significant problems, and the oil change interval is reduced to approximately 1,500–2,300 miles (2,400–3,680 km), depending on the oil temperature. The body of data included within the box C represents high temperature operation due to extended idling, heavy engine loading, etc. Under such conditions, oil oxidation and thickening become significant problems, and the oil change interval is reduced to 3,000–5,000 miles (5,000–8,000 km). Data falling between the boxes A and B, and beyond the box C tends to follow a parabolic pattern, as shown, when oil change interval is plotted in a reciprocal manner.

Figure 3:
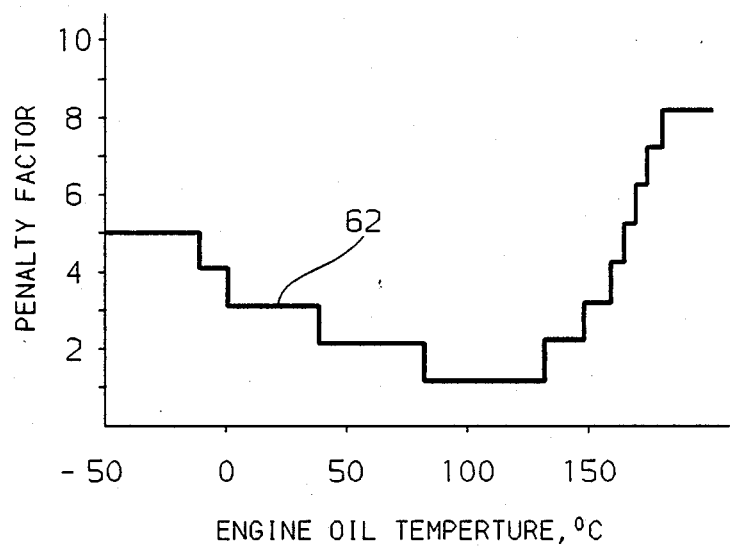
FIG. 3 is a graphical representation of the relationship between measured oil temperature and penalty factor value used in this invention.

FIG. 3 graphically depicts the assignment of penalty factors as a function of oil temperature on an engine revolution accumulation basis, as shown in trace 62. The factors are based on the data presented in FIG. 2, and are determined without regard to engine load, per se. Trace 62 shows the penalty factors in different ranges of engine oil temperature. Although the particular trace 62 has been found appropriate for at least one engine, some results have indicated that certain engines may require a larger penalty factor at the very lowest temperatures or that an additional penalty might be added for those engines during very cold starts.

Figure 4:
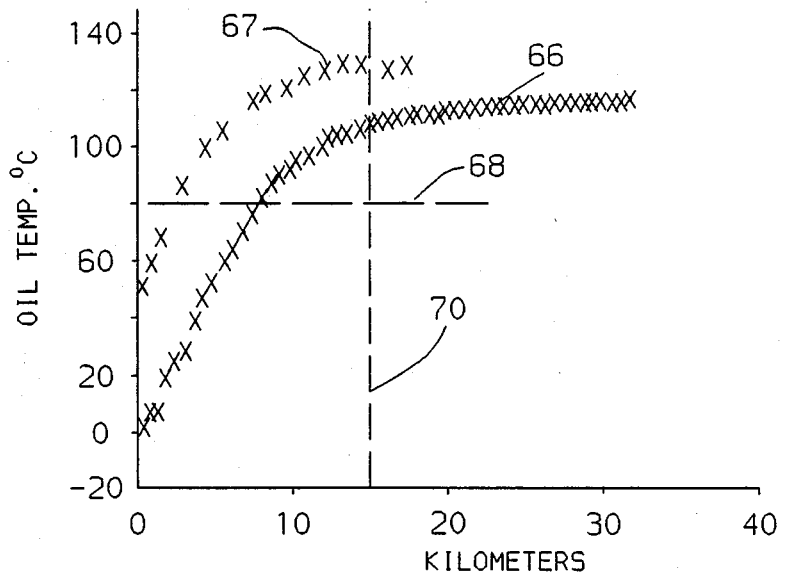
FIG. 4 is a graphical representation of the change in engine oil temperature as a function of distance traveled for a vehicle under two different driving patterns.

Typically, if an engine is cold at start-up, oil temperature increases by a nearly constant increment each time the engine fires. Once oil temperature reaches approximately 80 degrees C, it begins to level off. Once equilibrium has been attained, oil temperature remains constant as long as the number of engine revolutions per minute and other heating and cooling effects remain constant. FIG. 4 graphically represents two typical engine oil warming curves as a function of distance traveled for a vehicle with a 5.7L V-8 engine. In the lower curve 66, the engine was cold (0 degrees C.) at the start of testing; and, once equilibrium oil temperature was attained, the vehicle was driven at lower engine speeds than were used in the upper curve 67. In the case of upper curve 67, the engine oil was 49 degrees C. at the start of testing; and, once equilibrium oil temperature was attained, the vehicle was driven at higher engine speeds with rapid accelerations and decelerations. In spite of their differences, however, each of curves 66 and 67 may be considered to consist of two nearly linear portions: a warming curve below dashed line 68 at 80 degrees C. and an equilibrium curve to the right of dashed line 70 at 15 kilometers driven distance. As can be deduced from curves 66 and 67, the opposing factors which control warming and cooling in an engine assume different importance depending on whether one is operating in the warming region or the equilibrium region.

Once oil temperature is greater than approximately 80 degrees C., it tends to assume a value which becomes nearly constant as a function of time or distance travelled as long as engine speed, vehicle speed and ambient temperature remain constant. The actual value of this substantially constant equilibrium oil temperature tends to be slightly higher than engine coolant temperature but varies with the latter factors of the previous sentence. Engine speed appears to have a significant increasing effect on this temperature. High ambient temperatures have a slight warming effect, while greater vehicle speed usually has a cooling effect, due to the greater air flow over the engine. It should be noted, however, that ambient temperature and vehicle speed are generally smaller, secondary effects compared to engine speed and that some engines show an increase in oil temperature with vehicle speed. There is also an engine effect—that is, a difference from one type of engine to another due to the particulars of the engine designs.

A model of engine oil temperature in engine operation, to be accurate, will thus operate in two modes: a warmup mode in which oil temperature starts at a particular initial temperature and increases proportionally with the number of engine firings until it reaches a warmup temperature such as 80 degrees C. and an equilibrium mode in which oil temperature may be indicated by engine coolant temperature as modified by engine speed and, if the secondary cooling effects are considered important for greatest accuracy, a cooling factor such as ambient temperature or vehicle speed (or both). In each range, an additional engine dependent term will take care of the engine effect. The data indicate that, in each of the warmup and equilibrium modes, linear relationships will provide good accuracy.

Figure 5:
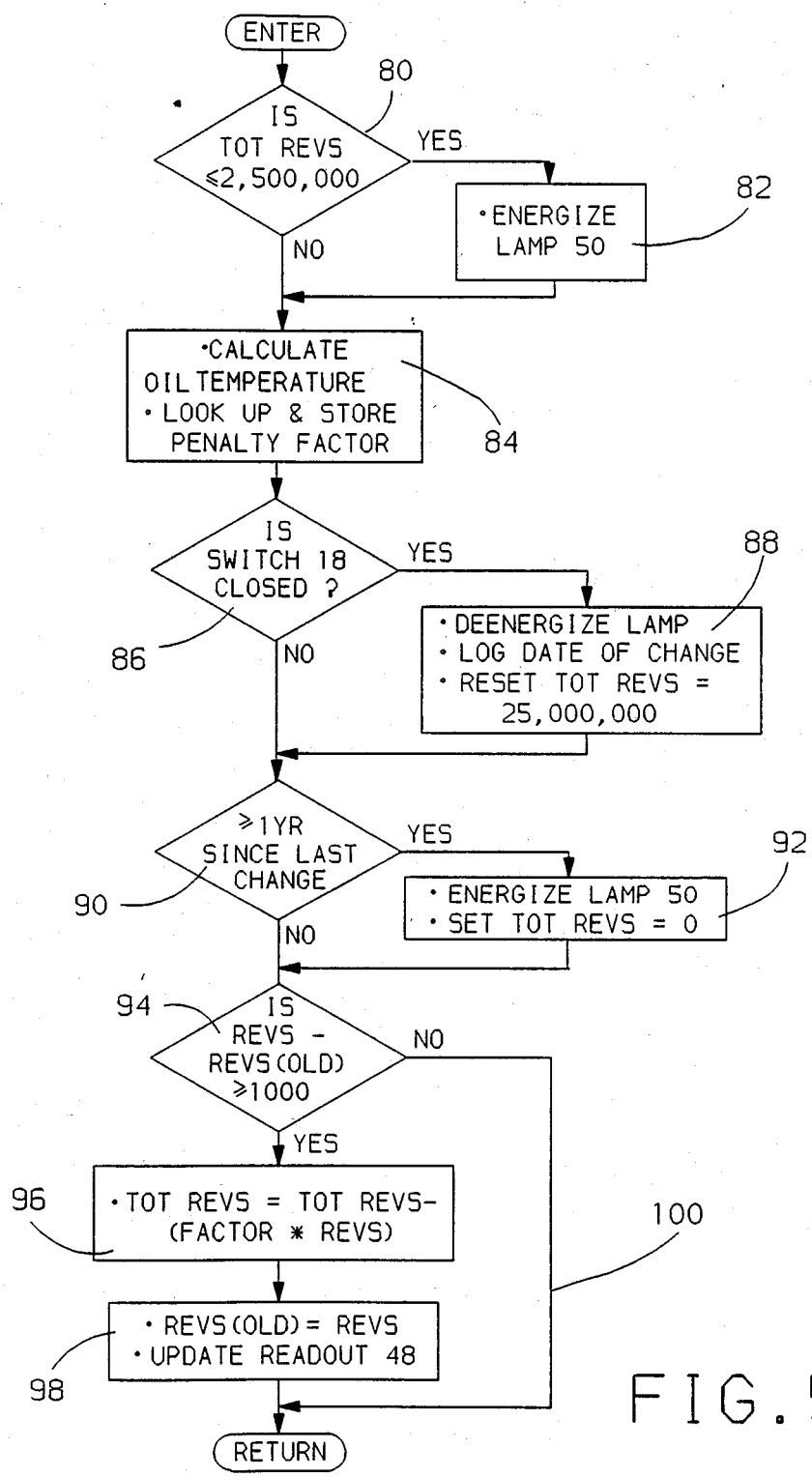
FIG. 5 depicts a flow diagram representative of computer program instructions to be executed by the control system computer of FIG. 1 for carrying out the control functions of this invention.

FIG. 5 depicts a flow diagram representative of program instructions executed by the Microcomputer 24 of FIG. 1 for carrying out the control functions of this invention. Since the controller will likely perform other functions in addition to the control functions of this invention, the flow diagram is depicted as a subroutine which is periodically called from a main program. In a particular motor vehicle installation of this invention, the engine oil was found to have a maximum useful life of 25,000,000 engine revolutions, which corresponds to 12,000 miles (19,200 km). In more general terms, we have found that the maximum useful life in engine revolutions, MAXREV, can be related to driven miles according to the expression:

$$MAXREV = k \times (N_e/N_v) \times 720,000$$

where k is a constant approximately equal to one (1) depending on the vehicle, and $(N_e/N_v)$ is the ratio of engine speed to vehicle speed when the vehicle transmission is in high gear and the torque converter, if any, is prevented from slipping. In such expression, the number 720,000 derives from the product of maximum driven miles (12,000) and the conversion term of 60 min/hr.

On entering the flow diagram, decision block 80 is executed to determine if a term indicative of the total remaining engine revolutions, TOT REVS, has been decremented below 2,500,000—that is, to less than 10% of its assumed useful life. If so, the instruction block 82 is executed to energize the lamp 50 to indicate that the engine oil should be changed. Then, or directly after decision block 80 if TOT REVS is not below 2,500,000, another instruction block 84, which can take the form of another subroutine, is called for the calculation of the oil temperature and the derivation, from the calculated oil temperature, of a temperature dependent penalty factor from a look-up table in memory containing the information graphically represented by the trace 62 of FIG. 3. Decision block 86 is then executed to determine if the oil change reset switch 18 has been closed, indicating that the oil has been changed. If so, the instruction block 88 is executed to deenergize lamp 50 (if energized), to log the date of the oil change, and to reset the term TOT REVS to the assumed useful life of 25,000,000 revolutions. Then, or directly after decision block 86 if switch 18 has not been closed, decision block 90 is executed to determine if one year or more has elapsed since the date logged at the last closure of the oil change reset switch 18. If so, instruction block 92 is executed to energize lamp 50 for indicating that the oil should be changed, and to set the term TOT REVS equal to zero. Then, or directly after decision block 90 if less than a year has elapsed since the last oil change, decision block 94 is executed to determine if the count, REVS, in Counter 28 (or similar counter which accumulates engine revolutions) exceeds a prior count, REVS(OLD), by more than 1000. If so, instruction blocks 96 and 98 are executed to decrement the term TOT REVS by the product (FACTOR * REVS), to set the term REVS(OLD) equal to REVS, and to update the readout 48. If decision block 94 is answered in the negative, the execution of instruction blocks 96 and 98 is skipped, as indicated by flow diagram line 100. The subroutine then returns the computer to the main program from which it was called.

An enhancement to the apparatus would keep track of actual mileage and provide for a change oil signal at the manufacturer's maximum recommended mileage (e.g. 7,500 miles) after the last oil change regardless of the oil life as determined otherwise by the apparatus with reference to actual or calculated oil temperature. This could take the form of a true mileage counter and an additional decision block between decision blocks 90 and 94 which would lead to an instruction block such as instruction block 92 if the true mileage exceeds 7,500.

Figure 6:
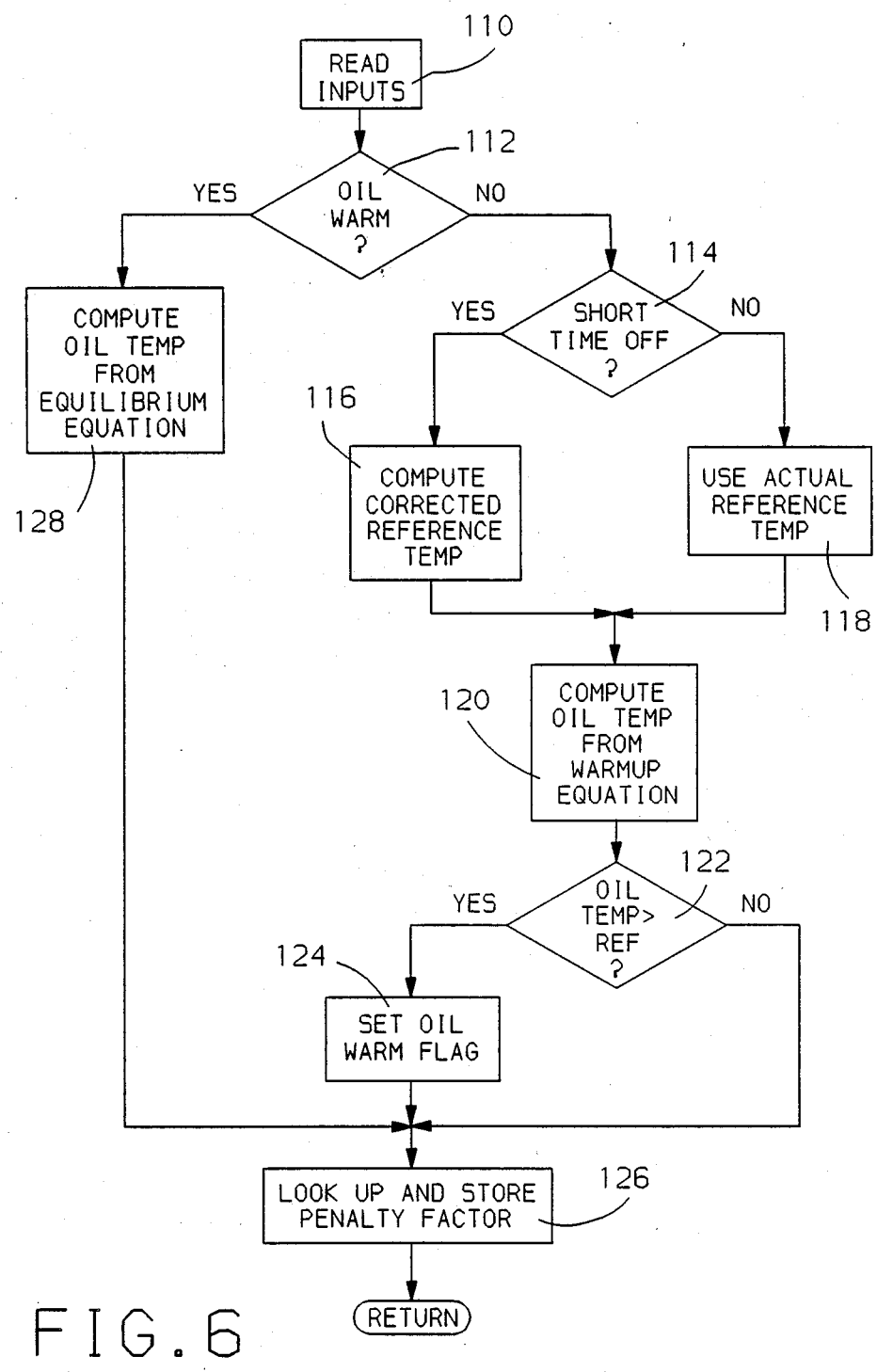
FIG. 6 depicts a flow diagram representative of computer program instructions for a subroutine for the calculation of engine oil temperature to be called by the program illustrated in FIG. 5.

The preceding subroutine is essentially identical to that described in the aforementioned Schwartz et al patent except for subroutine 84 which, in the aforementioned patent, was an instruction block providing for a reading of the oil temperature as sensed by an oil temperature sensor but, in this invention, is a subroutine providing a calculated oil temperature from other engine operating parameters. Subroutine 84 is described in detail with reference to FIG. 6.

Subroutine 84 begins with an instruction block 110, in which the required inputs of engine operating parameters are read. These inputs include at least the outputs of sensors 14 and 16 and may include others a described herein. Engine coolant sensor 14 is read, with the value at any time assigned to the variable $T_e$ and the value at the beginning of engine operation assigned to a fixed number $T_c$, from which a value $T_r$ may be derived as described below. The value of $T_c$, although fixed as of the beginning of engine operation, will depend both on ambient temperature and the recent operating history of engine 10. The input from sensor 16 is used to derive the number of firings or engine revolutions (proportional thereto) since the beginning of engine operation as well as the value of engine rotational speed.

Decision block 112 next determines if the engine is operating in a warmup mode or an equilibrium mode, which correspond to the warmup and equilibrium regions already described with reference to FIG. 4. This information is stored in memory, preferably as a flag bit, which comprises a binary datum in which a first value indicates one of the modes and a second value indicates the other. This flag bit may be one bit of a multi-bit control byte in which other bits indicate other binary data in a practice well known to computer programmers. In the apparatus and method of this invention, this flag bit is always reset to the value indicating warmup mode when engine operation is initiated, regardless of actual engine oil temperature, and is only set to the value indicating equilibrium mode when the calculated engine oil temperature reaches a predetermined value such as 80 degrees C.

If decision block 112 determines that the engine is in its warmup mode, there is an implication that engine operation has recently been initiated; and subroutine 84 next enters decision block 114, which determines a short time off duration: that is, whether the engine had been turned off from its last engine operation, before the initiation of the present engine operation, for a time shorter than a predetermined short time off duration. This may be determined in the following manner. Clock 22 is powered directly from the vehicle battery at least for the short time off duration after the operation of engine 10 is stopped. As the operation of engine 10 is stopped, a real time counting routine is started in computer 12 for the pulses of clock 22. If the engine is started before the counting routine counts the full predetermined short time off duration, a value derived from the count and indicating a short time off duration $D_t$ is stored in non-volatile memory 30 and another flag bit may be set in a control byte in the same memory. Decision block 114 will read the flag bit, indicate a short time off and read the short time off duration $D_t$ in the first call of subroutine 84. If, however, the full predetermined short time off duration is counted with no engine restart, the short time off flag is reset, the memory location containing the short time off duration $D_t$ may be set to a value producing a null effect, and the computer may then shut itself down. Upon eventual engine restart, decision block 114 will read no short time off during the first call of subroutine 84.

Subroutine 84 derives a reference temperature $T_r$ from initial coolant temperature $T_c$. If decision block 114 determines a short time off for engine 10, reference temperature $T_r$ is a corrected reference temperature computed in instruction block 116. However, if decision block 114 determines no short time off for engine 10, the reference temperature $T_r$ is made equal, in instruction block 118, to initial coolant temperature $T_c$, which may be considered an actual, uncorrected reference temperature. This determination and correction of the reference temperature for short engine time off is based on empirical data indicating that, if engine 10 has been off for more than an hour, the oil and coolant temperatures are approximately the same but, for an engine off duration of less than an hour, these temperatures are different, with the coolant exhibiting temperatures greater than oil temperatures, particularly under conditions consisting of a sequence of short trips alternated with short stops. The correction may take the form $T_r = c_1 + c_2 T_c + c_3 D_t$, wherein $T_r$ is the corrected reference temperature, $T_c$ is the initial engine coolant temperature as read from the coolant temperature sensor at the beginning of engine operation, $D_t$ is the engine off time duration, $c_1$ is a negative constant and $c_2$ and $c_3$ are positive constants. Typical values for the constants are: $c_1 = -20$ degrees C., $c_2 = 1$ and $c_3 = 0.3$ degrees C./minute, where all temperatures are in degrees C. and $D_t$ is in minutes. Alternatively, a constant value may be subtracted from the calculated oil temperature at the initiation of engine operation.

From either of instruction blocks 116 or 118, subroutine 84 proceeds next to instruction block 120, in which the engine oil temperature $T_o$ is calculated according to a warmup equation $T_o = k_1 + k_2 T_r + k_3 F_f$, wherein $T_r$ is the reference temperature, corrected or not, $F_f$ is a firing factor proportional to the number of combustion firings since the beginning of engine operation, and $k_1$, $k_2$ and $k_3$ are constants. Firing factor $F_f$ may be the number of firings or the number of engine revolutions since the initiation of engine operation and may be determined by accumulating the count of the flywheel teeth in engine speed sensor 42 or counting the firings of the vehicle ignition control system. Each of these parameters is available or can easily be programmed to be available within control unit 12. Typical values, assuming temperatures in degrees C., are $k_2 = 1$, $k_3 = 0.00154$ degrees C./firing for all engines with values for degrees C./revolution depending on the number of engine cylinders and ignition pattern, and varying values of $k_1$ from 0 to $-18$ degrees C., for example, depending on the engine. This calculation produces a value for engine oil under warmup conditions that starts at an initial temperature and increases linearly with engine cylinder firings.

From instruction block 120, subroutine 84 proceeds to decision block 122, in which it determines whether the oil temperature as just calculated is greater than a reference temperature, such as 80 degrees C. If so, the oil warm flag is set in instruction block 124; and, if not, the oil warm flag is left unchanged. Finally, in instruction block 126, subroutine 84 looks up and stores in memory a penalty factor as seen in FIG. 3 for the calculated engine oil temperature for use in the subroutine of FIG. 5 before returning to that subroutine.

From decision block 112, if the oil warm flag is set, subroutine proceeds to instruction block 128 before performing instruction block 126. In instruction block 128, subroutine 84 calculates the oil temperature To according to an equilibrium equation $T_o = k_4 + k_5 T_e + k_6 S_e + k_7 F_c$, wherein $T_e$ is an engine temperature and particularly, in this embodiment, the current value of an engine coolant temperature in degrees C. $S_e$ is engine rotational speed in rpm; $F_c$ is an engine cooling factor; and $k_4$, $k_5$, $k_6$ and $k_7$ are constants. Engine coolant temperature $T_e$, once again, is distinguished from initial engine coolant temperature $T_c$ and its derivative reference temperature $T_r$ by being a variable during engine operation. The value of $T_e$ is a current value, not one fixed at the beginning of engine operation and therefore constant during any particular engine operation. Cooling factor $F_c$ is a factor provided to account for the observed effect of ambient air cooling on engine 10 and therefore on the engine lubricating oil. One parameter which may be used for cooling factor $F_c$ is the ambient air temperature itself in degrees C. This parameter is useful in itself, since higher ambient temperature restricts cooling of the engine. In addition, this parameter also includes the heating effects of air conditioning, since the use of an air conditioner will generally increase with ambient temperature and will cause additional engine oil heating. However, ambient temperature is not always available without an additional sensor. Another such parameter which may be used is vehicle speed in kilometers per hour (kph), since higher vehicle speeds tend to produce cooling of the engine as it moves through the air; and this parameter is generally available or can easily be made available for use in computer 12. However, it has already been noted that some engines are observed to produce higher engine oil temperatures with increased vehicle speed. Typical values of constants $k_4$, $k_5$, $k_6$ and $k_7$ are, for the equation using ambient air temperature: $k_4$ variable with engine from $-3$ to $-11$ degrees C., $k_5 = 1$, $k_6 = 0.0106$ degrees C./rpm and $k_7 = 0.13$. Typical values for the equation using vehicle speed are: $k_4$ variable depending on engine from $-1$ to $-12$ degrees C., $k_5 = 1$, $k_6 = 0.0114$ degrees C./rpm and $k_7 = -0.0213$ degrees C./kph. It can be seen by substituting typical values in the equation for coolant temperature, engine speed and ambient temperature or vehicle speed that the contribution of the cooling factor $F_c$, regardless of which parameter is used, is quite small. Correction for ambient temperature, vehicle speed or both will probably never affect calculated oil temperature by more than a few degrees C. This is sufficiently small in comparison to the other terms of the equation to be considered a secondary effect and may thus, in some cases, be ignored.

Figure 7A:
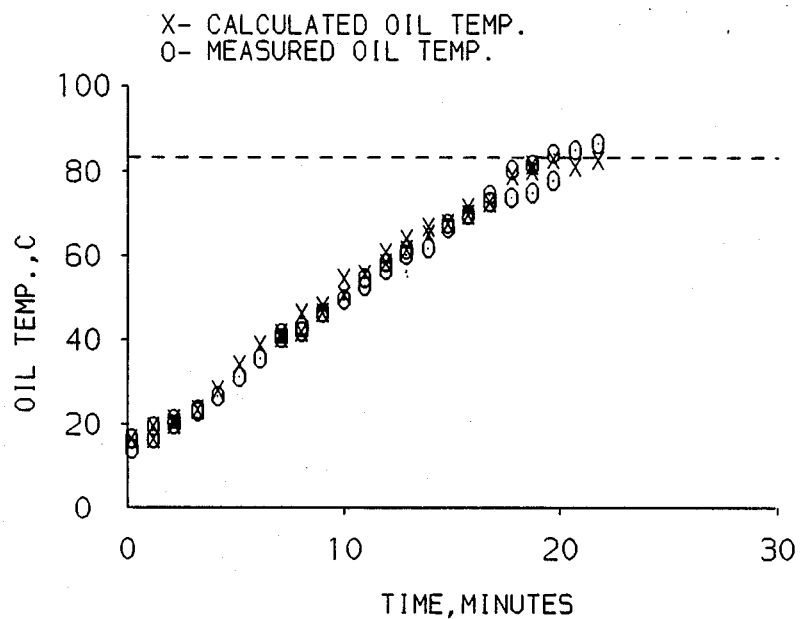
FIGS. 7a and 7b are graphical representations of the correlation between actual sensed engine oil temperature and engine oil temperature as calculated in the apparatus and method of this invention.
Figure 7B:
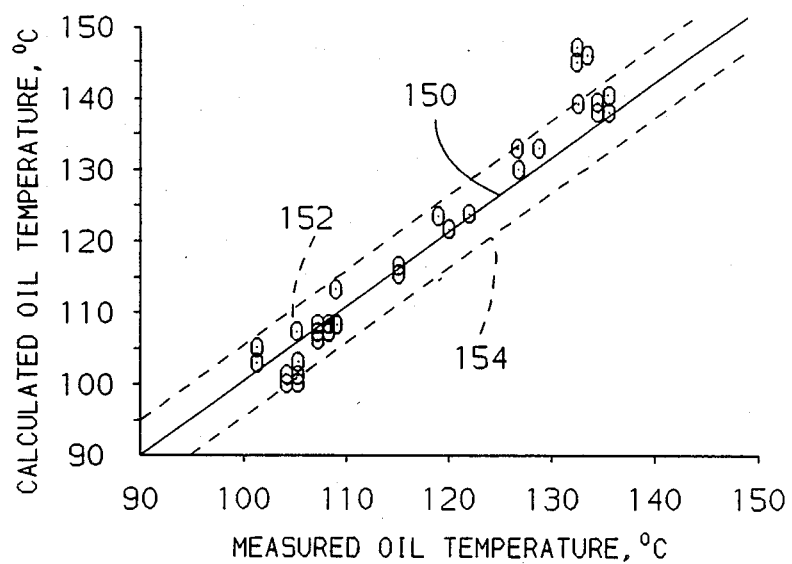

The correlation of calculated engine oil temperature, as determined with the apparatus and method of this invention, and measured engine oil temperature is excellent, as shown in FIGS. 7a and 7b. FIG. 7a shows calculated engine oil temperature as X's and measured engine oil temperature as O's for an engine started at normal ambient temperature and run for 20 minutes, at which time the engine oil temperature reached 80 degrees C. FIG. 7b shows calculated vs. measured engine oil temperatures for many engine operations at a variety of steady state operating points superimposed on a solid line 150 indicating perfect one-to-one correlation and dashed lines 152, 154 indicating plus and minus 5 degrees C. deviations, respectively. Except for one group of three points measured in first gear at high engine speed, all points are within the 5 degrees C. deviation lines.

As set forth above, the embodiment described is mechanized in a remaining engine oil life indicating apparatus by storing a number indicative of the maximum useful life of the engine oil in nonvolatile memory, and periodically decrementing the number by an amount determined in relation to the current penalty factor and the number of engine revolutions which define the period. The stored number, and thus the remaining engine oil life, is continuously displayed on the readout 48 or other suitable display. The lamp 50 is lit to warn the operator to change the oil soon when the stored number is reduced to within 10% of its assumed maximum value. A calculated engine oil temperature is derived from sensed parameters other than engine oil temperature itself combined in either the warmup equation or equilibrium equation as described herein; and the penalty factor is determined from the calculated engine oil temperature as the engine oil temperature relates to the oil degradation criteria described above in reference to FIG. 2, and not in accordance with the engine load, per se. When the engine oil is changed and the reset switch 18 actuated, the stored number is reset to the assumed maximum value.

The embodiments of the invention in which an exclusive property or privilege is claimed are defined as follows:

1. In a motor vehicle having an engine containing lubricating engine oil which has a useful life that varies in accordance with engine operating conditions and apparatus for determining the remaining useful life of the engine oil in engine operation from the engine oil temperature, apparatus for determining the engine oil temperature without direct measurement thereof comprising, in combination:

means for storing a datum having a first value indicating that the engine oil temperature is in a warming range and a second value indicating that the engine oil temperature is in an equilibrium range, the stored datum being set to the first value at the beginning of engine operation;

means responsive to the first value of the stored datum to calculate the engine oil temperature $T_o$ according to a warmup equation $T_o = k_1 + k_2 T_r + k_3 F_f$, wherein $T_r$ is a reference temperature indicative of engine oil temperature at the beginning of engine operation, $F_f$ is a firing factor proportional to the number of combustion firings since the beginning of engine operation, and $k_1$, $k_2$ and $k_3$ are constants;

means responsive to the second value of the stored datum to calculate the engine oil temperature $T_o$ according to an equilibrium equation $T_o = k_4 + k_5 T_e + k_6 S_e$, wherein $T_e$ is an engine temperature indicative of engine oil temperature, $S_e$ is engine rotational speed, and $k_4$, $k_5$ and $k_6$ are constants;

means for storing the calculated engine oil temperature $T_o$ for use by the apparatus for determining the remaining useful life of the engine oil; and means for setting the stored datum to its second value when the calculated engine oil temperature $T_o$ exceeds a predetermined warmup temperature.

2. The apparatus of claim 1 in which the reference temperature $T_r$ is derived from an initial engine coolant temperature $T_c$ at the beginning of engine operation and the engine temperature $T_e$ is the engine coolant temperature.

3. The apparatus of claim 1 in which an additional term $k_7F_c$ is added to the equilibrium equation, wherein $F_c$ is an engine cooling factor and $k_7$ is a constant.

4. The apparatus of claim 3 in which the engine cooling factor $F_c$ is ambient air temperature.

5. The apparatus of claim 3 in which the engine cooling factor $F_c$ is vehicle speed.

6. The apparatus of claim 3 in which the engine cooling factor $F_c$ is a linear combination of ambient air temperature and vehicle speed.

7. The apparatus of claim 1 in which the value of the reference temperature $T_r$ in the warmup equation is corrected, from a sensed value of the reference temperature $T_r$, when engine operation is initiated less than a predetermined short time off duration after the last preceding cessation of engine operation, so as to correct for a difference between the reference temperature and actual engine oil temperature during the predetermined short time off duration after engine operation is stopped.

8. The apparatus of claim 2 further comprising:

means for sensing an initial engine coolant temperature $T_c$ at the beginning of engine operation;

means for deriving the reference temperature $T_r$ by decreasing the initial engine coolant temperature $T_c$ when an off time duration $D_t$ between the initiation of the present engine operation and the cessation of the last preceding engine operation is less than a predetermined short time off duration, the reference temperature $T_r$ otherwise being equal to the initial engine coolant temperature $T_c$.

9. The apparatus of claim 8 in which, when the off time duration $D_t$ is less than the predetermined short time off duration, the means for deriving the reference temperature $T_r$ senses and stores the off time duration $D_t$ and derives the reference temperature $T_r$ according to the equation $T_r = c_1 + c_2T_c + c_3D_t$, wherein $c_1$ is a negative constant and $c_2$ and $c_3$ are positive constants.

10. In a motor vehicle having an engine containing lubricating engine oil which has a useful life that varies in accordance with engine operating conditions and apparatus for determining the remaining useful life of the engine oil in engine operation from engine oil temperature, a method for determining the engine oil temperature without direct measurement thereof comprising the steps of:

storing a datum having a first value indicating that the engine oil temperature is in a warming range and a second value indicating that the engine oil temperature is in an equilibrium range;

setting the stored datum to the first value at the beginning of engine operation;

calculating the engine oil temperature $T_o$, when the stored datum has the first value, according to a warmup equation $T_o = k_1 + k_2T_r + k_3F_f$, wherein $T_r$ is a reference temperature indicative of engine oil temperature at the beginning of engine operation, $F_f$ is a firing factor proportional to the number of combustion firings since the beginning of engine operation, and $k_1$, $k_2$ and $k_3$ are constants;

calculating the engine oil temperature $T_o$, when the stored datum has the second value, according to an equilibrium equation $T_o = k_4 + k_5T_e + k_6S_e$, wherein $T_e$ is an engine temperature, $S_e$ is engine rotational speed, and $k_4$, $k_5$ and $k_6$ are constants;

storing the calculated engine oil temperature $T_o$ for use by the apparatus for determining the remaining useful life of the lubricating oil; and setting the stored datum to its second value when the calculated engine oil temperature $T_o$ exceeds a predetermined warmup temperature.

11. The method of claim 10 in which an additional term $k_7F_c$ is added to the equilibrium equation, wherein $F_c$ is an engine cooling factor and $k_7$ is a constant.

12. The method of claim 11 in which the engine cooling factor $F_c$ is ambient air temperature.

13. The method of claim 11 in which the engine cooling factor $F_c$ is vehicle speed.

14. The method of claim 11 in which the engine cooling factor $F_c$ is a linear combination of ambient air temperature and vehicle speed.

* * * * *